(12) United States Patent
Lee et al.

(10) Patent No.: US 12,407,050 B2
(45) Date of Patent: Sep. 2, 2025

(54) BATTERY MODULE INCLUDING ADHESIVE MEMBER FOLLOWING FLUCTUATING PATTERN BETWEEN BATTERY CELLS AND METHOD OF MANUFACTURING THE SAME

(71) Applicant: LG Energy Solution, Ltd., Seoul (KR)

(72) Inventors: Youngho Lee, Daejeon (KR); Junyeob Seong, Daejeon (KR); Hun Byung Park, Daejeon (KR); Junkyu Park, Daejeon (KR); Siwon Jeon, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 665 days.

(21) Appl. No.: 17/640,138

(22) PCT Filed: Dec. 31, 2020

(86) PCT No.: PCT/KR2020/019286
§ 371 (c)(1),
(2) Date: Mar. 3, 2022

(87) PCT Pub. No.: WO2021/137576
PCT Pub. Date: Jul. 8, 2021

(65) Prior Publication Data
US 2022/0302538 A1   Sep. 22, 2022

(30) Foreign Application Priority Data

Jan. 3, 2020  (KR) .................. 10-2020-0001004
Dec. 30, 2020  (KR) .................. 10-2020-0188256

(51) Int. Cl.
*H01M 50/209*  (2021.01)
*H01M 50/289*  (2021.01)

(52) U.S. Cl.
CPC ....... *H01M 50/209* (2021.01); *H01M 50/289* (2021.01)

(58) Field of Classification Search
CPC ..................... H01M 50/209; H01M 50/289
(Continued)

(56) References Cited

U.S. PATENT DOCUMENTS 5,149,602 A   9/1992  Savovic et al.
6,166,322 A   12/2000 Chen et al.
(Continued)

FOREIGN PATENT DOCUMENTS

CN   1577907 A    2/2005
CN   204271146 U  4/2015
(Continued)

OTHER PUBLICATIONS

Search Report dated Jul. 21, 23 from Office Action for Chinese Application No. 2020800584779 issued Jul. 22, 2023. 3 pgs.
(Continued)

*Primary Examiner* — Sean P Cullen
(74) *Attorney, Agent, or Firm* — Lerner David LLP (57) ABSTRACT

A battery module according to an embodiment of the present disclosure includes a battery cell stack containing a plurality of battery cells stacked along one direction, and a module frame for housing the battery cell stack. The battery cells adjacent to each other in the battery cell stack are coupled together by a first adhesive member including a cured spray-type adhesive is cured. The first adhesive member follows at least one fluctuating pattern that extends along a direction different from the direction along which the plurality of battery cells are stacked.

20 Claims, 7 Drawing Sheets

(58) Field of Classification Search
USPC .......................................... 429/156, 158, 159
See application file for complete search history.

(56) References Cited

U.S. PATENT DOCUMENTS

| | | | |
|---|---|---|---|
| 6,745,948 | B1 | 6/2004 | Hidaka et al. |
| 2005/0007783 | A1 | 1/2005 | Ono |
| 2015/0303425 | A1 | 10/2015 | Kong |
| 2017/0021394 | A1 | 1/2017 | Ohno et al. |
| 2018/0074130 | A1 | 3/2018 | Jeung et al. |
| 2018/0108881 | A1 | 4/2018 | Jin et al. |
| 2019/0016061 | A1 | 1/2019 | Zeng |
| 2019/0062609 | A1 | 2/2019 | Nakada et al. |
| 2019/0348650 | A1* | 11/2019 | Nakamoto ........ H01M 10/0481 |

FOREIGN PATENT DOCUMENTS

| | | | |
|---|---|---|---|
| CN | 107636883 | A | 1/2018 |
| CN | 109072033 | A | 12/2018 |
| CN | 109411667 | A | 3/2019 |
| JP | H05190162 | A | 7/1993 |
| JP | 2006172994 | A | 6/2006 |
| JP | 2007070436 | A | 3/2007 |
| JP | 2008208169 | A | 9/2008 |
| JP | 2008226560 | A | 9/2008 |
| JP | 2009268949 | A | 11/2009 |
| JP | 2015002264 | A | 1/2015 |
| JP | 2015-026424 | A | 2/2015 |
| JP | 2016009658 | A | 1/2016 |
| JP | 2017066368 | A | 4/2017 |
| JP | 2017176923 | A | 10/2017 |
| JP | 2018511159 | A | 4/2018 |
| JP | 2018081885 | A * | 5/2018 |
| JP | 2019009055 | A | 1/2019 |
| KR | 20130062230 | A | 6/2013 |
| KR | 20160123707 | A | 10/2016 |
| KR | 20160143068 | A | 12/2016 |
| KR | 2018-0068506 | A | 6/2018 |
| KR | 20190082180 | A | 7/2019 |
| WO | WO-2018163708 | A1 * | 9/2018 ........ H01M 10/0404 |

OTHER PUBLICATIONS

Search Report dated May 23, 2024 from Office Action for Chinese Application No. 202080058477 issued May 25, 2024. 3 pgs.
International Search Report for PCTKR2020019286 dated Apr. 12, 2021, 2 pgs.
Extended European Search Report including Written Opinion for Application No. 20908947.3 dated Oct. 21, 2024, pp. 1-8.

* cited by examiner

FIG. 1

PRIOR ART

FIG. 2

PRIOR ART

BATTERY MODULE INCLUDING ADHESIVE MEMBER FOLLOWING FLUCTUATING PATTERN BETWEEN BATTERY CELLS AND METHOD OF MANUFACTURING THE SAME

CROSS-REFERENCE TO RELATED APPLICATIONS

This application is a national phase entry under 35 U.S.C. § 371 of International Application No. PCT/KR2020/019286 filed Dec. 31, 2020, which claims priority from Korean Patent Application No. 10-2020-0001004 filed on Jan. 3, 2020 and Korean Patent Application No. 10-2020-0188256 filed on Dec. 30, 2020, the disclosures of which are incorporated herein by reference in their entirety.

TECHNICAL FIELD

The present disclosure relates to a battery module and a method of manufacturing a battery cell assembly, and more particularly, to a battery module formed using a spray-type adhesive and a method for manufacturing a battery cell assembly.

BACKGROUND ART

Secondary batteries, which can be easily applied to various product groups and have electrical characteristics such as high energy density, are universally used not only in portable devices but also in electric vehicles or a hybrid electric vehicles, energy storage systems or the like, which are driven by electric driving sources. Secondary batteries are attracting attention as new environmentally-friendly energy sources for improving energy efficiency since they offer a primary advantage of remarkably reducing the use of fossil fuels and also do not generate by-products from the use of energy at all.

Small-sized mobile devices use one or several battery cells for each device, whereas middle- or large-sized devices such as vehicles require high power and large capacity. Therefore, a middle- or large-sized battery module having a plurality of battery cells electrically connected to one another are used.

The middle or large-sized battery modules are preferably manufactured so as to have as small a size and weight as possible. Consequently, a prismatic battery or a pouch-shaped battery, which can be stacked with high integration and has a small weight relative to capacity, is usually used as a battery cell in middle or large-sized battery modules. In particular, pouch-type batteries using an aluminum laminate sheet as a battery case have recently been attracting a lot of attention.

Figure 1:
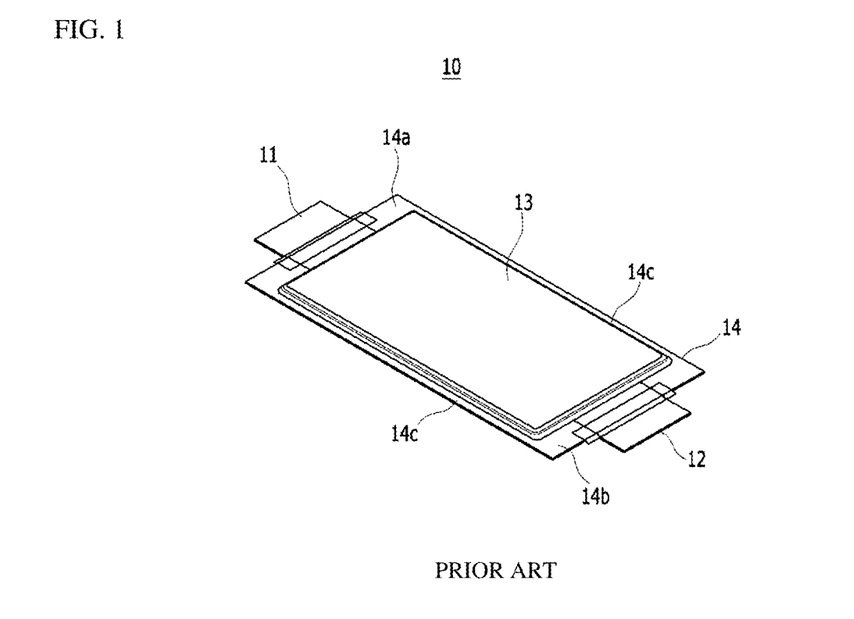
FIG. 1 is a perspective view showing a conventional pouch-type battery.
Figure 2:
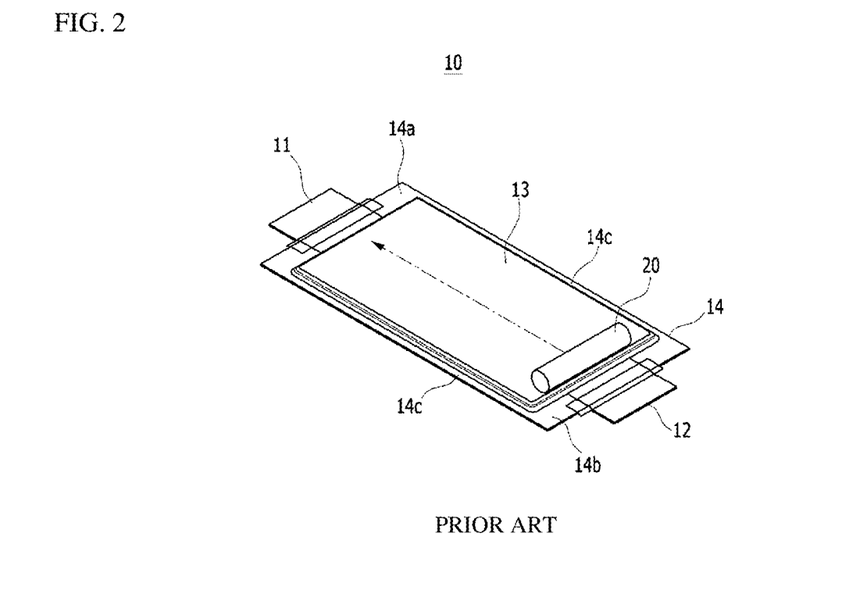
FIG. 2 is a perspective view showing a process of attaching a double-sided tape to the pouch-type battery of FIG. 1.

FIG. 1 is a perspective view showing a conventional pouch-type battery. FIG. 2 is a perspective view showing a process of attaching a double-sided tape to the pouch-type battery of FIG. 1.

Referring to FIG. 1, the secondary battery 10 has a structure in which two electrode leads 11 and 12 are opposed to each other and protruded from one end part 14a and the other end part 14b of the battery body 13, respectively, and the secondary battery 10 is manufactured by attaching both end parts 14a and 14b of the case 14 and both side surfaces 14c connecting them in a state in which an electrode assembly (not shown) is housed in the battery case 14.

The battery case is generally composed of a laminate structure of a resin layer/a metal thin film layer/a resin layer. For example, in a case where the surface of the battery case is made of an O (oriented)-nylon layer, at the time of stacking a large number of battery cells to form a middle or large-sized battery module, there is a tendency to slip easily due to external impact. Therefore, referring to FIG. 2, in order to prevent this and maintain a stable laminate structure of the battery cells, an adhesive such as a roll-type double-sided tape 20 is attached to the surface of the battery case, and the battery cells are laminated to form a middle or large-sized battery module.

However, in the case of these types of adhesives, there are situations where the minimum width that can be applied is fixed, and there is restriction on customization to attach the adhesive to a desired part. In addition, when the double-sided tape is used for a long period of time, the adhesive component deteriorates and the adhesive strength can be greatly reduced. Further, defects occur when, for example, the double-sided tape is not transferred or sags, such that continuous management is required during the process, and, as a result, the unit price increases and profitability is decreases.

DETAILED DESCRIPTION OF THE INVENTION

Technical Problem

It is an object of the present disclosure to provide a battery module formed using a spray-type adhesive that can replace a double-sided tape, and a method for manufacturing a battery cell assembly.

However, the problem to be solved by embodiments of the present disclosure is not limited to the above-described problems, and can be variously expanded within the scope of the technical idea included in the present disclosure.

Technical Solution

A battery module according to one embodiment of the present disclosure includes: a battery cell stack containing a plurality of battery cells stacked in one direction, and a module frame for housing the battery cell stack, wherein among the plurality of battery cells, the battery cells adjacent to each other are coupled with a first adhesive member on which the spray-type adhesive is cured, and wherein the first adhesive member has at least one wobble pattern that is extended along a direction different from the one direction in which the plurality of battery cells are stacked.

The wobble pattern of the first adhesive member may have at least two swirl patterns parallel to each other on one surface of the battery cell.

The first adhesive member may include a plurality of dot patterns arranged along the direction in which the wobble pattern extends.

The battery module may further include a compression pad that is located between the module frame and the battery cell stack.

The battery module may further include a second adhesive member located between the compression pad and the battery cell stack, wherein the second adhesive member may include at least one wobble pattern or double-sided tape extending along a direction different from the direction in which the plurality of battery cells are stacked.

When swelling of the battery cell occurs, the thickness of the first adhesive member may be reduced.

The method for manufacturing a battery cell assembly according to one embodiment of the present disclosure is a method for manufacturing a battery cell assembly in which a plurality of battery cells are stacked, the method comprising the steps of: moving a cell adhesive contained in an adhesive tank to a spray gun, spraying the cell adhesive onto one surface of the battery cell through a nozzle of the spray gun, and stacking the plurality of battery cells, wherein the cell adhesive coming out through the nozzle is sprayed onto one surface of the battery cell while forming a wobble pattern.

The wobble pattern may include a swirl pattern.

The cell adhesive may be sprayed while the spray gun moves along a direction perpendicular to the stacking direction of the battery cells, or the cell adhesive may be sprayed onto one surface of the battery cell while the battery cell moves in a state where the spray gun is fixed.

One surface of the battery cell on which the cell adhesive is sprayed may correspond to a surface of the battery cell perpendicular to the stacking direction of the battery cells.

The spray gun may include an air hole located around the nozzle, and the cell adhesive coming out through the nozzle swirls by the wind coming out of the air hole.

The step of spraying the cell adhesive onto one surface of the battery cell through a nozzle of the spray gun may include a step in which the cell adhesive is naturally cooled in air until it comes into contact with one surface of the battery cell from the nozzle.

The cell adhesive may include a hot melt adhesive, and the method for manufacturing a battery cell assembly may further include a step of melting the hot melt adhesive contained in the adhesive tank.

The cell adhesive may include a UV adhesive, and the method for manufacturing a battery cell assembly may further include a step of curing the UV adhesive after spraying the UV adhesive onto one surface of the battery cell.

The step of stacking the plurality of battery cells may include a step of picking up and moving another surface of the battery cell.

The method for manufacturing a battery cell assembly may, after the step of stacking the plurality of battery cells, further include the steps of: detaching a battery cell corresponding to a defective cell or a poorly stacked battery cell, and removing the cell adhesive on one surface of the detached battery cell by using a removing agent.

The removing agent may include a mixture of isoparaffine L, hydrotreated light distillate, mineral spirits.

The step of removing the cell adhesive may include applying the removing agent to a first lint free wiper, and removing the cell adhesive attached to one surface of the detached battery cell with the first lint free wiper.

In the step of detaching a battery cell corresponding to a defective cell or a poorly stacked battery cell, the removing agent may be thrust between battery cells adjacent to each other to detach the battery cells by a physical force.

After the step of removing the cell adhesive with the first lint free wiper, the removing agent remaining on one side of the detached battery cell may be removed with a second lint free wiper to which ethyl acetate is applied.

Advantageous Effects

According to the embodiments of the present disclosure, by using a spray-type adhesive capable of replacing a double-sided tape, an adhesive application device for attachment between battery cells can be directly applied to the manufacturing process line of the battery cell assembly.

By spraying the spray-type adhesive onto one surface of the battery cell through a nozzle of a spray gun, an adhesive member having a swirl pattern can be formed.

By forming an adhesive member having a wobble pattern, it is possible to control the amount of application so that revision is possible when detaching a defective battery cell.

By removing the spray-type adhesive using a removing agent during revision, physical scratches and chemical residues on the surface of the battery cell can be minimized.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when a view is referred to as "cross-sectional", it means that a target portion is viewed from the side of a cross section cut vertically.

FIGS. 3 to 9 are views showing a method of manufacturing a battery cell assembly according to one embodiment of the present disclosure.

Figure 3:
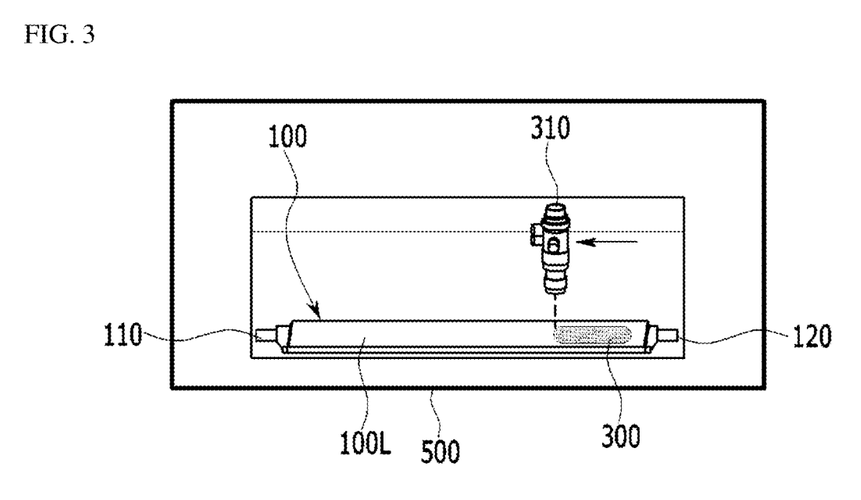
FIGS. 3 to 9 are views showing a method of manufacturing a battery cell assembly according to one embodiment of the present disclosure.

Referring to FIG. 3, the battery cell 100 according to the embodiment of the present disclosure has a structure in which two electrode leads 110 and 120 having different polarities are opposed to each other and protruded from one end part and the other end part of the battery body, respectively, and the battery cell 100 is manufactured by attaching both end parts of the battery case and both side surfaces connecting them in a state in which an electrode assembly is housed in the battery case. The battery case is generally composed of a laminate structure of a resin layer/a metal thin film layer/a resin layer.

The method of manufacturing a battery cell assembly according to the embodiment of the present disclosure may include a step of automatically transferring a battery cell 100 to a spray station 500 by a conveyor. Here, the conveyor is a mechanical device that automatically and continuously transports between prescribed distances, and for example, a belt conveyor or a roller conveyor can be used. The conveyor is a generally well-known mechanical device, so the illustration will be omitted.

According to the embodiment of the present disclosure, a device for applying a cell adhesive 300 for attachment between the battery cells 100 can be applied directly to a process line for the method of manufacturing a battery cell assembly. For this purpose, the cell adhesive 300 sprayed from the spray gun 310 may be a hot melt adhesive that has undergone a process of being first contained in an adhesive tank and melted at a high temperature. The cell adhesive 300 contained in the adhesive tank can be moved to the spray gun 310 through a hose or the like. In a modified embodiment, the cell adhesive 300 may be a UV adhesive, and the UV adhesive is contained in the adhesive tank in a state of being melted at room temperature, and can be moved to the spray gun 310 through a hose or the like.

In a state where the battery cell 100 that has been transferred to the spray station 500 is fixed at its position, the spray gun 310 can be moved based on the present input coordinate values. At this time, the spray gun 310 sprays the cell adhesive 300 toward one surface 100L of the battery cell 100, and the cell adhesive 300 sprayed onto one surface 100L of the battery cell can form an adhesive member. As described above, according to this embodiment, since the cell adhesive 300 is applied directly on the process line, it is easy to customize the part where the cell adhesive 300 is applied.

Figure 4:
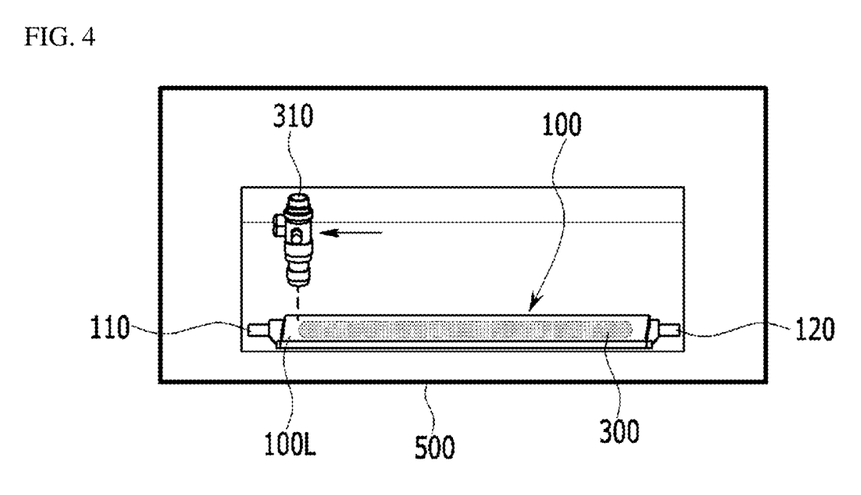

As an example, as shown in FIGS. 3 and 4, the cell adhesive 300 can be sprayed while the spray gun 310 moves from one surface 100L of the battery cell adjacent to a positive electrode lead 120 toward the one surface 100L of the battery cell adjacent to the negative electrode lead 110. The spray gun 310 may spray the cell adhesive 300 while moving along one direction perpendicular to the stacking direction of the battery cells 100. At this time, according to the embodiment of the present disclosure, the cell adhesive 300 may be sprayed onto one surface 100L of the battery cell 100 while forming a wobble pattern. The wobble pattern may mean that the path through which the cell adhesive 300 is sprayed wobbles. This will be described in detail with reference to FIGS. 5 to 7.

Figure 5:
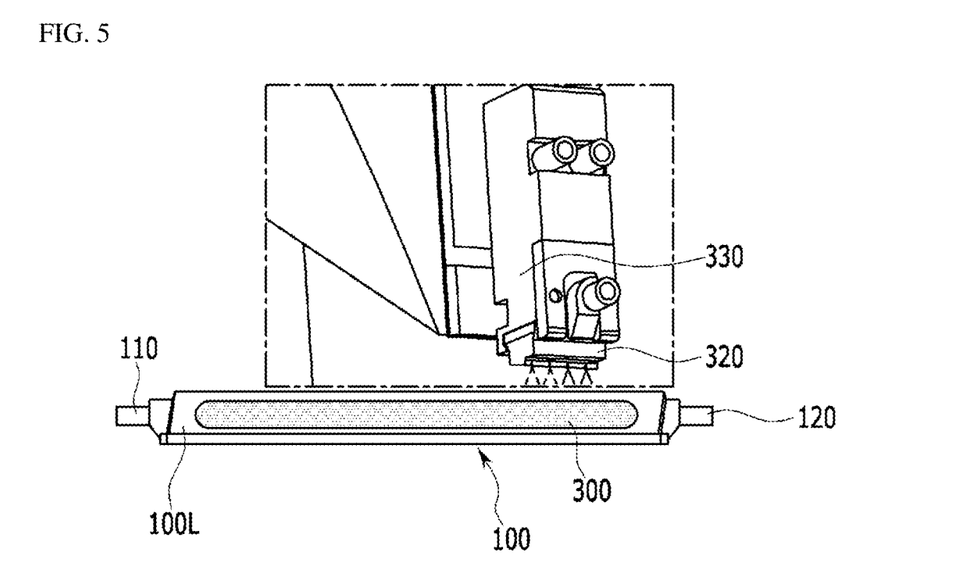
Figure 6:
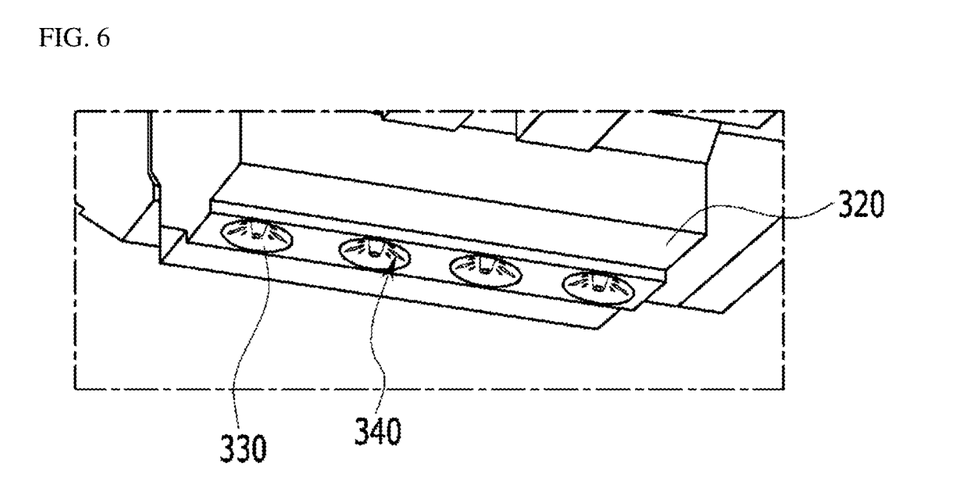
Figure 7:
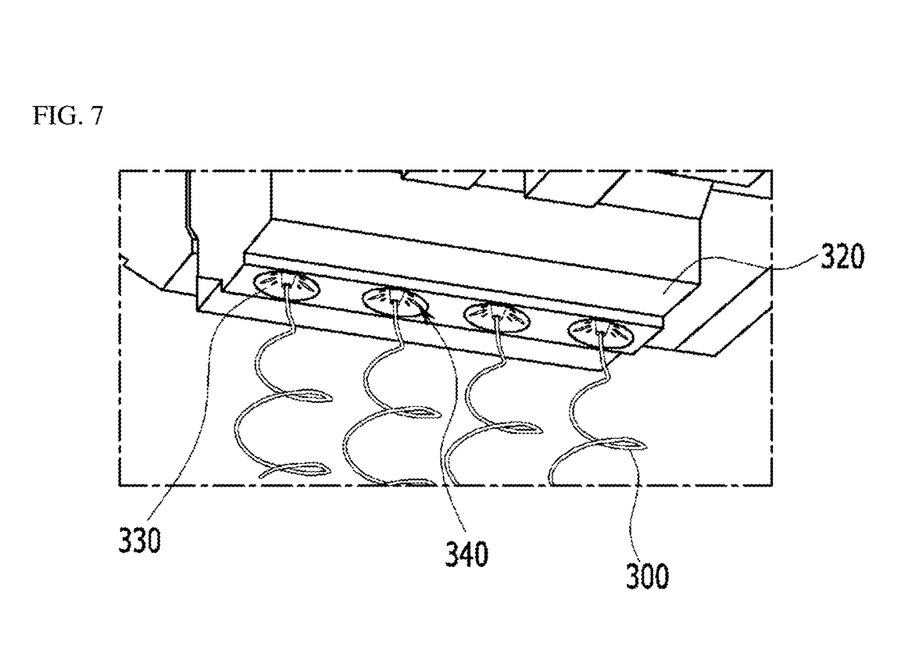

FIG. 5 is a perspective view showing a method of applying an adhesive in a method of manufacturing a battery cell assembly according to one embodiment of the present disclosure. FIG. 6 is a perspective view showing a nozzle included in the spray gun according to the embodiment of FIG. 5. FIG. 7 is a perspective view showing a cell adhesive pattern sprayed from a nozzle included in the spray gun of FIG. 6.

Referring to FIGS. 5 and 6, the spray gun 310 according to the embodiment of the present disclosure includes a nozzle 320 at its end part. The nozzle 320 may have a total of 4 spray outlets 330, and the number of the spray outlets 330 of the nozzle 320 is not limited thereto and may be modified according to the width of the battery cell 100. The cell adhesive 300 is sprayed through the nozzle 320 due to the pressure pump inside the spray gun 310 so that it can make contact with one surface 100L of the battery cell 100 to which the nozzle 320 is directed. One surface 100L of the battery cell 100 to which the cell adhesive 300 is sprayed corresponds to the surface of the battery cell 100 perpendicular to the stacking direction of the battery cells 100.

Referring to FIGS. 6 and 7, the spray gun 310 according to this embodiment includes an air hole 340 located around the nozzle 320. More specifically, a plurality of air holes 340 may be formed around the spray outlet 330 of the nozzle 320, and the cell adhesive 300 coming out through the nozzle 320 can swirl by the wind coming out of the air hole 340. The wobble pattern according to this embodiment may include a spraying structure of the cell adhesive 300 having a swirl pattern by the wind coming out of the air hole 340 as described above. In a case where the cell adhesive 300 is a hot melt adhesive, at the time of spraying the cell adhesive 300 onto one surface of the battery cell 100 through the nozzle 320 of the spray gun 310, the cell adhesive 300 may be naturally cooled in air until it makes contact with the one surface 100L of the battery cell 100 from the nozzle 320. When the temperature of the battery cell 100 is about 60 degrees Celsius or higher, it may cause a problem in the life of the battery cell 100. However, according to the embodiment of the present disclosure, the cell adhesive 300 can be automatically cooled while being sprayed through the nozzle 320 without a separate cooling process, thereby preventing the rise of the temperature of the battery cell 100. In a modified embodiment, when the cell adhesive 300 is a UV adhesive, the UV adhesive may be cured through a UV device after the step of spraying the cell adhesive 300 onto one surface of the battery cell 100. At this time, a nitrogen purging step may be added to prevent the UV adhesive from making contact with oxygen and reducing the adhesion strength.

In the foregoing, the spray gun 310 has been described as spraying the cell adhesive 300 while moving along the battery cell 100, but is not necessarily limited thereto, and the cell adhesive 300 may also be sprayed onto one surface 100L of the battery cell 100 while the battery cell 100 is moved in a state where the spray gun 310 is fixed.

Figure 8:
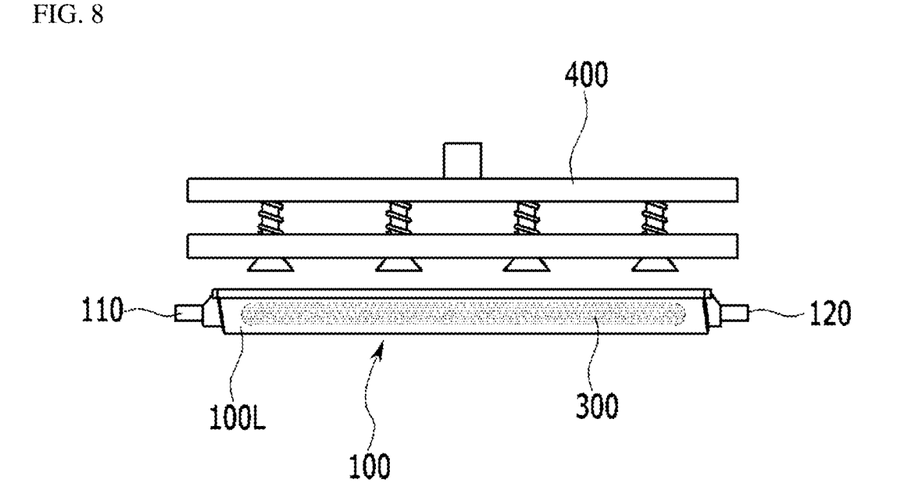
Figure 9:
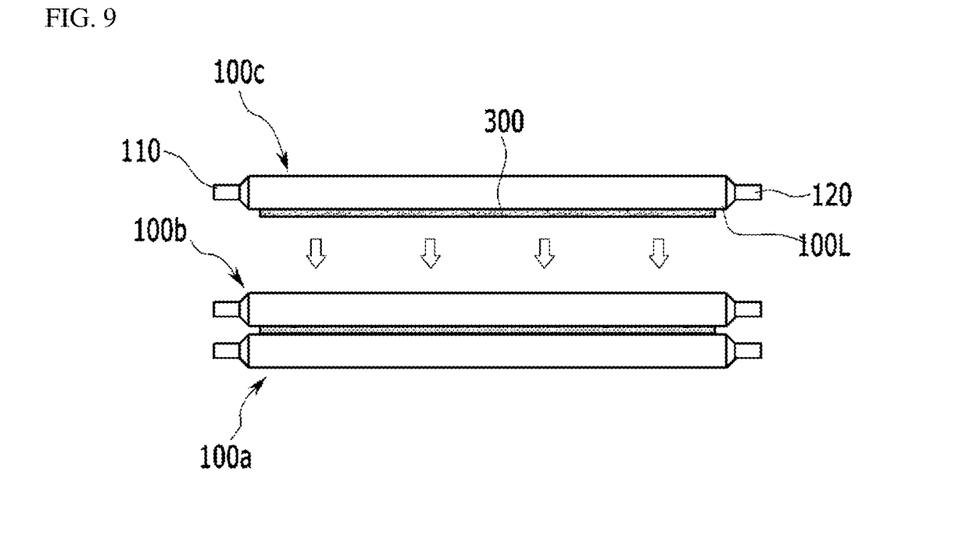

Referring to FIGS. 8 and 9, the method of manufacturing a battery cell assembly according to the embodiment of the present disclosure may further include a step of picking up the other surface of the battery cell 100, so that the plurality of battery cells 100 are stacked. The other surface of the battery cell 100 may be a surface corresponding to the one surface 100L of the battery cell 100 to which the cell adhesive 300 is applied, and may be a surface to which the cell adhesive 300 is not applied. The battery cell assembly according to this embodiment may include a first battery cell 100a, a second battery cell 100b attached to the first battery cell 100a by a cell adhesive 300, and a third battery cell 100c stacked on the second battery cell 100b. In this way, a plurality of battery cells are stacked to form a battery cell assembly, and electrode leads of the plurality of battery cells may be electrically connected. The cell adhesive 300 may be an adhesive member in a battery module.

A pickup robot 400 may be used to pick up the other surface of the battery cell 100. The preset coordinate values are input to the pickup robot 400, and the stacking process can be performed so that the other surface of the battery cell 100 can be stably picked up and attached to the adjacent battery cells. Such a stacking process is an example and can be modified by another method.

The method for manufacturing a battery cell assembly according to one embodiment of the present disclosure may, after the step of stacking the plurality of battery cells, further include the steps of: detaching a battery cell corresponding to a defective cell or a poorly stacked battery cell, and removing the cell adhesive on one surface of the detached battery cell by using a removing agent. The battery cells that require detachment may further include battery cells that are incorrectly stacked when a plurality of battery cells are stacked, as well as instances where a battery cell itself is defective. The revision described later is intended for the poorly stacked battery cells, and the defective battery cells may be discarded.

In the case of a conventional double-sided tape, the adhesive strength was strong, and thus the revision as above was practically impossible. However, according to this embodiment, the application amount of the cell adhesive 300 applied to the battery cell 100 can be minimized or optimized so as to enable revision by allowing for reattachment after detachment using a hot melt adhesive. Moreover, since the raw material is applied directly to the battery cell 100, the cost can be greatly reduced as compared with the case where the double-sided tape is commercialized and obtained. Further, according to the method of manufacturing a battery cell assembly according to the embodiment of the present disclosure, it is possible to prevent solid lumps generated by non-transfer of the existing double-sided tape or by loosening of the tape.

The removing agent may include a mixture of isoparaffine L, hydrotreated light distillate, and mineral spirits. The step of removing the cell adhesive 300 may include the steps of: applying the removing agent to a first lint free wiper, and removing the cell adhesive attached to one surface of the detached battery cell 100 with the first lint free wiper. In the step of detaching a battery cell corresponding to a defective cell or a poorly stacked battery cell, the removing agent may also be thrust between battery cells adjacent to each other to detach the battery cells by a physical force. After the step of removing the cell adhesive with the first lint free wiper, the removing agent remaining on one side of the detached battery cell may be removed with a second lint free wiper to which ethyl acetate is applied.

The removal method using the lint free wiper described above corresponds to an example for not damaging the pouch PET (polyethylene terephthalate) surface of the battery cell 100, and the cell adhesive may be removed using various methods as long as it does not damage the pouch of the battery cell 100.

Figure 10:
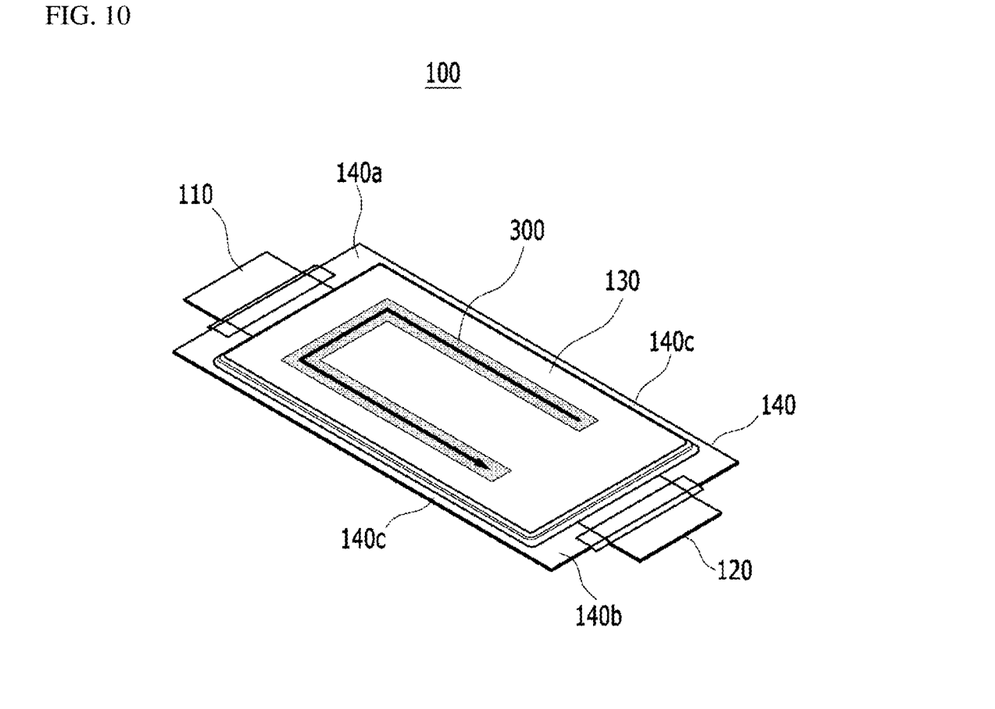
FIG. 10 is a perspective view showing a battery cell according to another embodiment of the present disclosure.

FIG. 10 is a perspective view showing a battery cell assembly according to another embodiment of the present disclosure.

Referring to FIG. 10, the battery cell 100 according to this embodiment has a structure in which the two electrode leads 110 and 120 are opposed to each other and protruded from one end part 140a and the other end part 140b of the battery body 130, respectively, and the battery cell 100 can be manufactured by attaching both end parts 140a and 140b of the battery case 140 and both side surfaces connecting them in a state in which an electrode assembly (not shown) is housed in the battery case 140. Thereafter, the cell adhesive 300 may be applied to one surface 100L of the battery cell 100 according to the method described above in connection with FIGS. 3 to 7.

In the manufacturing method according to the embodiment described above, a single cell adhesive 300 pattern extending in one direction of the battery cell 100 may be formed. In a modified embodiment, the shape of the cell adhesive 300 having various patterns may be realized as described below.

At this time, according to the embodiment of the present disclosure, as shown in FIG. 10, a pattern of the "⊏" shaped cell adhesive 300 may be formed by changing the application shape according to the spray method. This is an example of an application shape, and the cell adhesive 300 according to this embodiment may be formed of a hot melt adhesive or a UV adhesive. The cell adhesive may form at least two pattern portions parallel to each other on one surface of the battery cell 100. In addition to the "⊏" shape, the shape of the cell adhesive 300 having various patterns according to the width of the battery cell may be realized. For example, unlike the shape shown in FIG. 10, the cell adhesive 300 can also be applied in an 11-shape. That is, in contrast to the "⊏" shape shown in FIG. 10, the cell adhesive 300 lines of the upper and lower parts are not connected to each other, but instead form a structure having a linear shape parallel to each other. The cell adhesive 300 is naturally cooled to become an adhesive member between adjacent battery cells 100.

Figure 11:
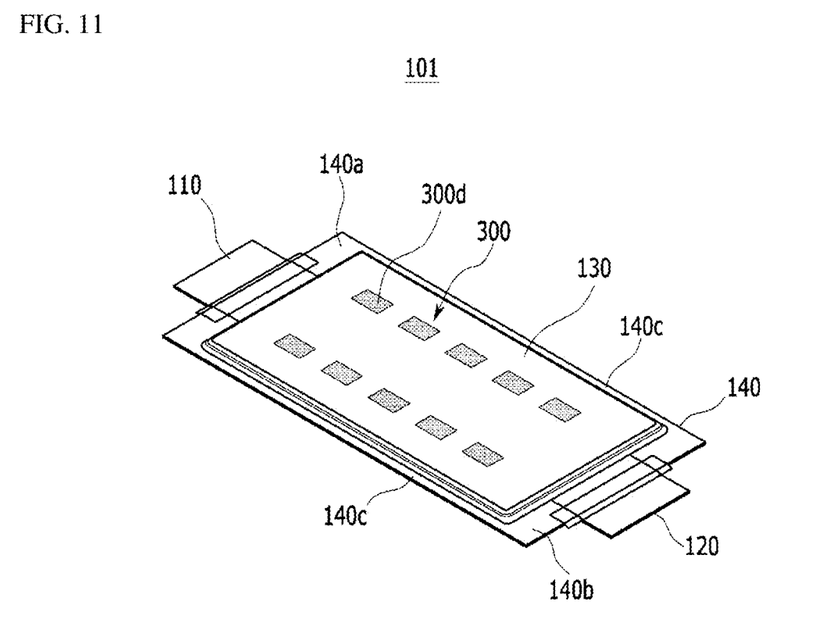
FIG. 11 is a perspective view showing a battery cell according to another embodiment of the present disclosure.

FIG. 11 is a perspective view showing a battery cell assembly according to another embodiment of the present disclosure.

Referring to FIG. 11, the cell adhesive 300 included in the battery cell 101 according to the embodiment of the present disclosure may include a plurality of dot patterns 300d arranged along a direction in which the wobble pattern extends. When a discontinuous pattern such as a plurality of dot patterns 300d is formed with the same length as the linear-shaped cell adhesive 300, the same adhesion effect can be obtained while reducing the amount of material of the cell adhesive 300.

In addition to the differences described above, all the contents described in the embodiment of FIG. 10 are applicable to this embodiment.

Figure 12:
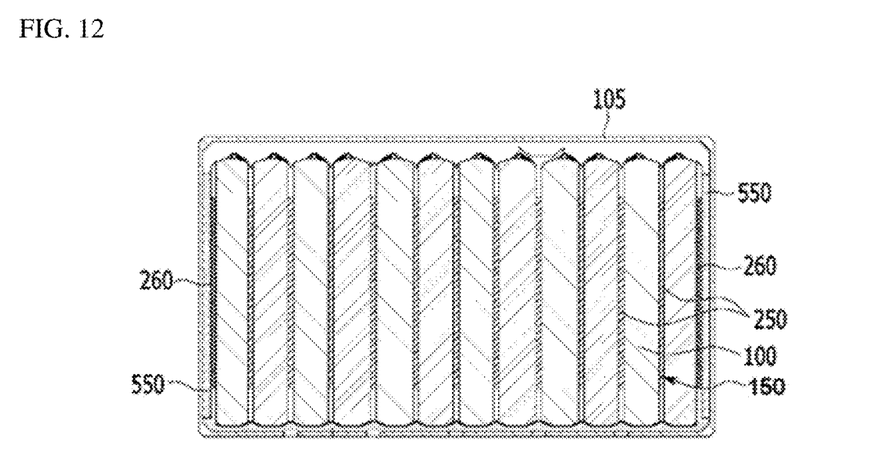
FIG. 12 is a cross-sectional view showing a battery module including a battery cell assembly according to another embodiment of the present disclosure.
Figure 13:
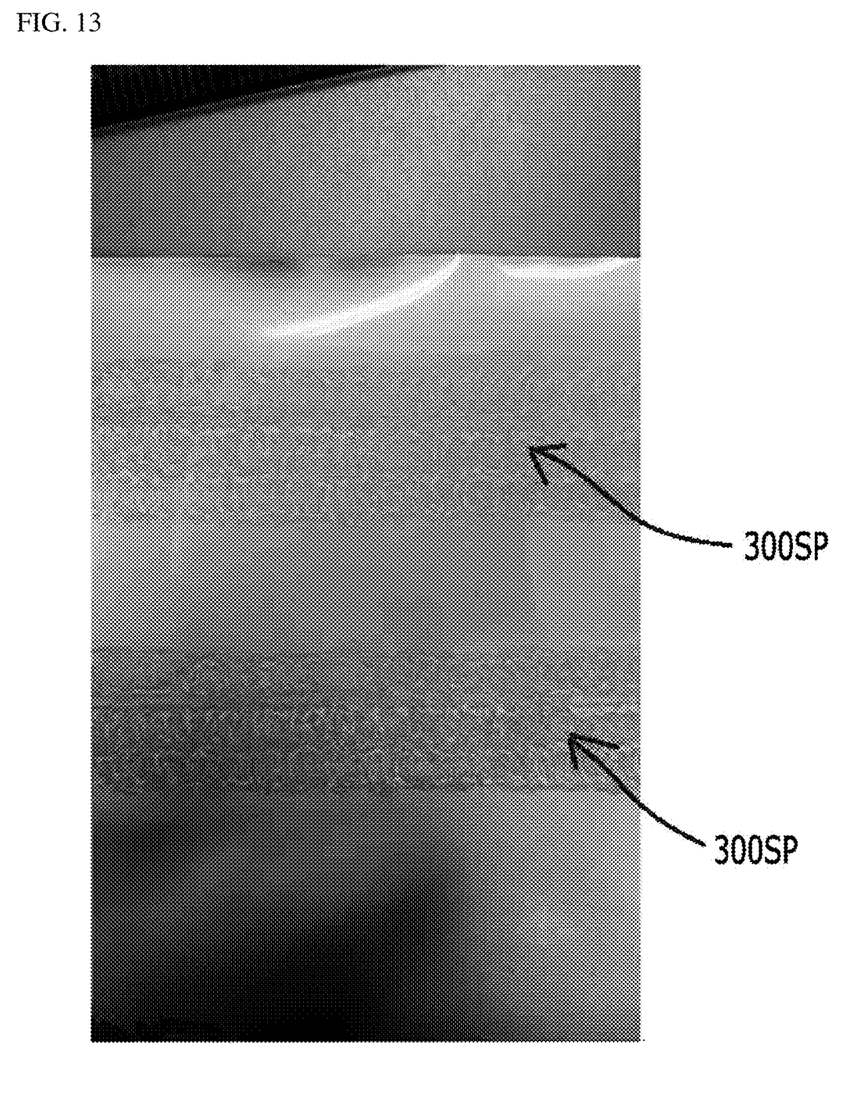
FIG. 13 is a photograph showing a swirl pattern formed on one surface of a battery cell of a battery cell assembly included in the battery module of FIG. 12.

FIG. 12 is a cross-sectional view showing a battery module according to another embodiment of the present disclosure. FIG. 13 is a photograph showing a swirl pattern formed on one surface of a battery cell of a battery cell assembly included in the battery module of FIG. 12.

Referring to FIG. 12, the battery module according to the embodiment of the present disclosure includes a battery cell assembly 150, a module frame 105 in which the battery cell assembly 150 is mounted, and a compression pad 550 located between the module frame 105 and the battery cell assembly 150. In the battery cell assembly 150 according to this embodiment, a first adhesive member 250 is located between the adjacent battery cells 100, and the battery module according to this embodiment may further include a second adhesive member 260 located between the compression pad 550 and the battery cell assembly 150. The second adhesive member 260 may include at least one wobble pattern or double-sided tape extending in one direction different from the direction in which the plurality of battery cells are stacked. Although not shown, the compression pad 550 may be formed between the battery cells 100 adjacent to each other. The compression pad formed between the battery cells 100 adjacent to each other may be attached to the battery cells 100 by an adhesive member including a wobble pattern or double-sided tape.

In the first adhesive member 250, the cell adhesive 300 described above is naturally cooled, and the adjacent battery cells 100 can be coupled to form the battery cell assembly 150. The first adhesive member 250 according to this embodiment has soft physical properties at room temperature, and when swelling of the battery cell 100 occurs, the first adhesive member 250 may be compressed. The first adhesive member 250 can be compressed by swelling of the battery cell 100 to reduce its thickness. In this way, since the thickness of the first adhesive member 250 is reduced by swelling of the battery cell 100, it is possible to reduce the stress applied to the module frame 105 due to the cell swelling.

Referring to FIGS. 12 and 13, the first adhesive member 250 according to the embodiment of the present disclosure is formed by curing a spray-type adhesive to couple adjacent battery cells 100. The first adhesive member 250 may have at least one wobble pattern extending along a direction different from the direction in which the plurality of battery cells 100 are stacked. In this case, the first adhesive member 250 may have at least two swirl patterns (300SP) parallel to each other on one surface of the battery cell 100. The wobble pattern may have various shapes, but in the case of the swirl pattern according to this embodiment, when the cell adhesive is applied, the application line can be kept clean because it is applied almost without scattering. This is because the adhesive coming out of the respective nozzles 320 of the spray gun 310 described in FIGS. 5 to 7 is connected by a thin line and connected in a wobble form to be applied.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS 100, 101: battery cell
  100a, 100b, 100c: first, second, and third battery cells
100L: surface
105: module frame
110, 120: electrode leads
130: battery body
140: battery case
  140a, 140b: battery case end part
  140c: battery case side surface
150: battery cell assembly
250: first adhesive member
260: second adhesive member
300: cell adhesive
  300d: dot pattern
  300SP: swirl pattern
310: spray gun
320: nozzle
330: spray outlet
340: air hole
400: pickup robot
500: spray station
550: compression pad

The invention claimed is:

1. A battery module comprising:
a battery cell stack containing a plurality of battery cells stacked along a first direction, and
a module frame for housing the battery cell stack,
wherein the battery cells adjacent to each other in the battery cell stack are coupled together by a first adhesive member including a cured spray adhesive,
wherein the first adhesive member follows at least one fluctuating shape extending along a second direction transverse to the first direction, and
wherein the fluctuating shape of the first adhesive member is maintained when the plurality of battery cells are stacked.

2. The battery module according to claim 1,
wherein the fluctuating shape of the first adhesive member includes at least two swirl patterns extending parallel to each other on a surface of at least one of the adjacent battery cells.

3. The battery module according to claim 1,
wherein the first adhesive member includes a plurality of dots arranged along the second direction.

4. The battery module according to claim 1,
wherein the first adhesive member is compressible, such that a thickness of the first adhesive member is reduced when swelling of at least one of the plurality of battery cells occurs.

5. The battery module according to claim 1,
further comprising a compression pad located between the module frame and the battery cell stack.

6. The battery module according to claim 5,
further comprising a second adhesive member located between the compression pad and the battery cell stack,
wherein the second adhesive member follows an at least one fluctuating shape or includes double-sided tape extending along a third direction different from the first direction.

7. A method for manufacturing a battery cell assembly containing a plurality of battery cells, the method comprising the steps of:
moving an adhesive from an adhesive tank to a spray gun,
spraying the adhesive through a nozzle of the spray gun and onto a surface of at least one of the plurality of battery cells, the adhesive being sprayed onto the surface of the at least one battery cell to form a fluctuating shape, and
stacking the plurality of battery cells along a stacking direction,
wherein the adhesive forms an adhesive member that maintains the fluctuating shape when the plurality of battery cells are stacked.

8. The method according to claim 7,
wherein the adhesive comprises a melt adhesive, and
the method further comprises a step of melting the melt adhesive contained in the adhesive tank.

9. The method according to claim 7,
wherein the adhesive includes a UV curable adhesive, and
the method further comprises a step of curing the UV curable adhesive after spraying the UV curable adhesive onto the surface of the at least one battery cell.

10. The method according to claim 7,
wherein the step of stacking the plurality of battery cells comprises a step of picking up and moving another surface of the at least one battery cell.

11. The method according to claim 7,
wherein the fluctuating shape includes a swirl pattern.

12. The method according to claim 11,
further comprising swirling the adhesive spraying out of the nozzle by airflow emanating from an air hole located adjacent to the nozzle.

13. The method according to claim 11,
wherein the step of spraying the adhesive onto the surface of the at least one battery cell comprises cooling the adhesive in air between the nozzle and the surface of the at least one battery cell.

14. The method according to claim 11,
wherein the adhesive is sprayed while the spray gun moves along a second direction perpendicular to the first direction along which the plurality of battery cells are stacked, or
the adhesive is sprayed onto the surface of the at least one battery cell while the spray gun is fixed and the at least one battery cell moves relative to the spray gun.

15. The method according to claim 14,
wherein the surface of the battery cell on which the adhesive is sprayed is oriented perpendicular to the first direction along which the plurality of battery cells are stacked.

16. The method according to claim 7, wherein after the step of stacking the plurality of battery cells, the method further comprises the steps of:

detaching a battery cell from the plurality of battery cells, and
removing the adhesive from the surface of the detached battery cell by using a removing agent.

17. The method according to claim 16,
wherein the removing agent comprises a mixture of isoparaffine L, hydrotreated light distillate, or mineral spirits.

18. The method according to claim 16,
wherein the step of removing the adhesive comprises applying the removing agent to a first lint free wiper, and
removing the adhesive attached to the surface of the detached battery cell with the first lint free wiper.

19. The method according to claim 18,
wherein the step of detaching the battery cell, comprises introducing the removing agent between adjacent ones of the plurality of battery cells.

20. The method according to claim 18,
further comprising, after the step of removing the cell adhesive with the first lint free wiper, removing any of the removing agent remaining on the surface of the detached battery cell with a second lint free wiper to which ethyl acetate is applied.

* * * * *